United States Patent [19]

Cammack

[11] Patent Number: 5,322,312
[45] Date of Patent: Jun. 21, 1994

[54] USER-PROPELLED VEHICLE

[76] Inventor: Milton A. Cammack, P.O. Box 1914, Imperial Beach, Calif. 91933

[21] Appl. No.: 741,664

[22] Filed: Aug. 7, 1991

[51] Int. Cl.⁵ .............................................. B62M 1/12
[52] U.S. Cl. .................................. 280/244; 280/233; 280/250.1; 280/304.1
[58] Field of Search ...................... 280/250.1, 233, 234, 280/244, 246, 253, 255, 258, 236, 237, 242.1, 211, 240, 251, 252, 304.1

[56] References Cited

U.S. PATENT DOCUMENTS

| | | | |
|---|---|---|---|
| 846,130 | 3/1907 | Muller | 280/246 |
| 1,058,123 | 4/1913 | Whitaker | 280/237 |
| 1,601,249 | 9/1926 | Hayden | 280/221 |
| 1,899,854 | 8/1931 | Cooper | 280/221 |
| 2,383,000 | 8/1945 | McLean | 280/258 |
| 3,895,825 | 7/1975 | Sink | 280/255 |
| 3,994,509 | 11/1976 | Schaeffer | 280/244 |
| 4,258,485 | 3/1981 | Gof | 280/253 |
| 4,560,181 | 12/1985 | Herron | 280/244 |
| 4,582,342 | 4/1986 | Lew et al. | 280/221 |
| 4,735,431 | 4/1988 | Tait | 280/246 |
| 4,762,332 | 8/1988 | Soel | 280/244 |
| 4,811,964 | 3/1989 | Horn | 280/255 |
| 4,865,344 | 9/1989 | Romero et al. | 280/255 |
| 4,925,200 | 5/1990 | Jones | 280/244 |
| 5,020,818 | 6/1991 | Oxford | 280/250.1 |
| 5,242,179 | 9/1993 | Beddome | 280/250.1 |

FOREIGN PATENT DOCUMENTS

| | | | |
|---|---|---|---|
| 0064807 | 1/1945 | Denmark | 280/244 |
| 0018156 | 4/1903 | United Kingdom | 280/258 |

Primary Examiner—Karin L. Tyson
Assistant Examiner—Anne Boehler
Attorney, Agent, or Firm—Knobbe, Martens, Olson & Bear

[57] ABSTRACT

A user-propelled vehicle has a wheelchair embodiment and a three-wheeled skateboard embodiment. In the wheelchair embodiment, a foldable frame has a seat for supporting the user and a propulsor movably attached to the frame for allowing the user to pump the propulsor. The propulsor is engaged with both rear wheels of the wheelchair through independent ratchet-clutch mechanisms for permitting torque to be transferred to one or both wheels when the propulsor is pumped to propel and steer the wheelchair. In the three-wheeled skateboard embodiment, a frame has two wheels mounted in tandem near the front of the frame and a third wheel mounted on the centerline of the frame behind the front wheels. Two pedals are hingedly mounted side-by-side on the frame and are ratchetably engaged with the rear wheel. Each pedal is movable between a thrust position, wherein the front portion of the pedal is raised from the frame, and a rest position, wherein the pedal is flush with the frame. Each pedal is spring-returned to its thrust position. The user can alternately or simultaneously depress the pedals to impart torque to the rear wheel and thereby propel the skateboard.

22 Claims, 7 Drawing Sheets

USER-PROPELLED VEHICLE

FIELD OF THE INVENTION

The present invention relates to user-propelled vehicles and more particularly to user-propelled wheelchairs and skateboards.

BACKGROUND

Several user-propelled vehicles have been introduced which allow the rider of the particular vehicle to propel the vehicle using the rider's limbs. These devices are preferred in certain applications over electrically-powered wheelchairs because user-propelled wheelchairs can, among other things, exercise the user's muscles while providing a means for the user to move about.

In one application for such vehicles, several wheelchairs have been introduced that include provisions for permitting the user of the wheelchair to propel the wheelchair. An example of one user-propelled wheelchair is shown in U.S. Pat. No. 4,506,900 to Korosue. The Korosue patent discloses a wheelchair having a lever that can be urged against by the user to impart torque, through a linkage system, to the wheels of the chair. Another user-propelled wheelchair is discussed in U.S. Pat. No. 4,865,344 to Romero, Sr. et al. As disclosed in the Romero, Sr. et al. patent, the wheelchair can be propelled by the user by urging against a portion of a push rod that is mounted on the frame of the Romero, Sr. et al. device. By urging on the push rod, the user generates a torque which can be imparted to the wheels of the device through a linkage system.

Unfortunately, the devices mentioned above can be difficult for some users to operate. More particularly, it may be difficult for a user whose fingers are debilitated to operate the propulsion levers of the devices mentioned above. Furthermore, users with limited use of their hands or fingers can find it difficult to steer such devices. Additionally, the devices mentioned above do not provide for augmenting the propulsive force imparted by appropriate movement of the user's upper body with propulsive force that can be supplied by the user's legs and feet. Thus, the devices mentioned above do not efficiently use all of the user's muscle power. Looked at in a different light, the devices above stimulate or exercise only a few body muscles of a user. This is unfortunate, because certain wheelchair users can benefit from the exercise and stimulation of partially debilitated leg muscles.

Furthermore, the devices mentioned above do not provide for easily adjusting the configuration of the devices to suit the physique of the user. Also, the devices mentioned above cannot be folded for easy storage of the wheelchair. The present invention recognizes that a user-propelled foldable wheelchair can be provided which can be easily steered by a person with a limited range of arm or finger motion, for example, a person with only one hand and no fingers, and which can exercise the person's leg or legs.

Accordingly, it is an object of the present invention to provide a user-propelled wheelchair which can be easily steered by a person with a limited range of arm or finger motion. It is another object of the present invention to provide a user-propelled wheelchair which can exercise the user's legs. A further object of the present invention is to provide a user-propelled wheelchair which is foldable and which is configurable to suit the physique of the particular user. Yet another object of the present invention is to provide a user-propelled wheelchair which is easy to use and cost-effective to manufacture.

In another application of user-propelled vehicles, several skateboards have been introduced which can be propelled by the user of the skateboard without requiring the user's foot to touch the ground. One example of such a device is the skateboard disclosed in U.S. Pat. No. 3,399,906 to Portnoff. The Portnoff patent discusses an occupant-propelled skateboard in which the motive force is supplied by the occupant through a pedal that is connected to a toothed arm. In accordance with the Portnoff invention, the toothed arm is ratchetably engaged with a gear, and the gear is attached to a rear axle of the skateboard. When the pedal is depressed by the occupant, the resulting torque is transferred through the arm and gear to the rear axle to propel the skateboard.

While skateboards such as the Portnoff invention do not require the user to touch the ground in order to propel the skateboard, it is unfortunately the case that such skateboards characteristically introduce mechanical complications relating to the steering of the skateboard. More particularly, most skateboards are steered by the operator of the skateboard by the operator appropriately shifting his weight on the board. When the operator shifts his weight to change the direction of the skateboard, the surface of the skateboard on which the operator stands tilts toward the intended new direction of motion.

It will be appreciated that while the skateboard's surface tilts, the wheels of the skateboard are intended to remain rollably engaged with the ground. Thus, relative tilting motion between the surface of the skateboard and the skateboard's wheels occurs whenever the direction of the skateboard is changed. Unfortunately, this tilting motion of the skateboard's surface relative to the wheels of the board can interfere with the smooth rotation of, for example, a drive gear such as the Portnoff drive gear, and thereby impede the operation of the skateboard.

Furthermore, the Portnoff skateboard cannot be slowed without abruptly stopping the skateboard. Specifically, the Portnoff skateboard, and most conventional skateboards, do not provide a direct means for retarding rotation of the wheels of the board. Instead, to stop the board, the user ordinarily must stop the board by jumping off or by causing a portion of the skateboard's surface to contact the ground.

The present invention recognizes that a user-propelled skateboard can be provided which permits tilting motion of the skateboard's surface relative to the wheels of the skateboard without unduly interfering with the propulsion components of the board. Also, the present invention recognizes that a skateboard can be provided in which the rotation of the wheels of the skateboard can be slowed by the user.

Accordingly, it is an object of the present invention to provide a user-propelled skateboard which permits tilting motion of the skateboard's surface relative to the wheels of the skateboard without unduly interfering with the propulsion components of the board. It is another object of the present invention to provide a user-propelled skateboard in which the rotation of the wheels of the skateboard can be slowed by the user without the user having to contact the ground or other object not part of the skateboard. Another object of this invention is to provide a user-propelled skateboard that can with practicality pull a hauling cart behind it. Yet another object of this invention is to provide a user-propelled skateboard in which the front can be elevated in such a way that the skateboard, balanced on one wheel somewhat like a unicycle, can be propelled by the hands and/or one foot, and in which a new variety of single wheel type steering can then be used. Still another object of the present invention is to provide a user-propelled skateboard which is easy and fun to use and cost-effective to manufacture.

SUMMARY

A user-propelled apparatus has a frame which includes a surface for supporting a user. In one presently preferred embodiment, the apparatus is a wheelchair that has two front wheels and two rear drive wheels, and the wheelchair has a propulsor for manually propelling the wheelchair by pumping the propulsor up and down. When the propulsor is pumped, torque is transmitted through ratchet-clutch mechanisms to the rear wheels for both therapeutic and locomotive purposes and for steering the wheelchair.

Specifically, the propulsor is selectively engageable with either one or both of the two rear wheels of the wheel chair to transmit torque to each wheel independently of whether torque is being transmitted by the propulsor to the other wheel. Thus, by appropriately engaging the propulsor with either one or both of the wheels, the user of the wheelchair can both propel and steer the wheelchair. A user who is partially debilitated in the upper body, e.g., a person without full use of hands or fingers, can nonetheless propel and steer the wheelchair, while obtaining therapeutic value through the light arm muscle exercise necessary to propel the wheelchair.

In accordance with the wheelchair embodiment of the present invention, the propulsor includes a horizontal push bar that is connected at its ends to first and second lever arms which extend downwardly from the push bar. The lever arms are hingedly connected to the frame for pumping movement of the propulsor between a first position and a second position relative to the frame. A plurality of springs are mounted on the frame for gently urging the propulsor toward the second position. Also, first and second axles are mounted on the frame, and the rear wheels are respectively connected to the first and second axles.

As envisioned by the present invention, each lever arm is coupled to a respective one of the rear wheels through a sprocket-chain mechanism. More particularly, each lever arm is fixedly attached to a large sprocket. A small sprocket is selectively engageable through a ratchet-clutch mechanism with the axle of one of the two rear wheels of the wheelchair, and a chain connects each large sprocket to its associated small sprocket. Thus, rotational motion of the large sprockets is transferred by the chains to the small sprockets.

Accordingly, when the propulsor is moved, the large sprockets are rotated, and, consequently, the small sprockets are also rotated. Importantly, each clutch permits selective engagement and disengagement of its associated small sprocket with the axle of the associated rear wheel, so that rotational motion of the small sprocket can be selectively transferred to the associated axle.

Operating levers are mounted on the cross-bar of the propulsor and are connected via respective cables to the respective clutches to operate the clutches. These levers can be movably mounted on the cross-bar, if desired, to permit custom positioning of the levers on the cross-bar. Whenever one of the clutches is operated to engage the small sprocket of the associated lever arm with its associated rear wheel axle, ratcheting motion of the lever arm with respect to the axle is permitted. In other words, whenever one of the small sprockets is engaged with its axle, movement of the propulsor toward the first position imparts torque to the rear wheel axle that is associated with the engaged small sprocket. On the other hand, movement of the propulsor toward the second position does not impart torque to the rear wheel. When one of the small sprockets is not engaged with its associated rear wheel axle, no torque can be imparted to the axle by motion of the propulsor.

Additionally, a brake is associated with each wheel for retarding rotation of the wheel. The brakes can be operated by associated brake levers that are movably mounted to the cross-bar of the propulsor.

Accordingly, it can be appreciated from the disclosure above that the user of the wheelchair can propel the wheelchair by engaging one or both clutches and pumping the propulsor between its first and second positions. Further, the user of the wheelchair can steer the wheelchair by selectively engaging the clutches or brakes and clutches via the associated clutch/brake levers on the horizontal cross-bar of the propulsor and pumping the propulsor. For example, to turn toward the right, the user can pump the propulsor and operate the right clutch lever to disengage the right clutch. To effect a relatively sharp turn toward the right, the user can additionally engage the right brake.

The wheelchair of the present invention may also include structure for folding the wheelchair. Further, the lever arms of the propulsor can include provisions for selectively increasing or decreasing the length of the lever arms to suit the physique of the user. Moreover, each lever arm of the propulsor can have a pedal attached thereto for providing a means to augment with the legs the pumping force applied to the propulsor by the user's upper body.

In an alternate embodiment of the user-propelled vehicle, the vehicle is a three-wheeled skateboard. The skateboard of the present invention includes a frame which has a surface for supporting a user. This surface defines first and second longitudinal sides which extend from the rear of the support surface to the front of the support surface, relative to the direction of intended motion of the skateboard. A first wheel is rotatably mounted on the forward portion of the frame adjacent the first side of the support surface and a second wheel is rotatably mounted on the portion of the frame adjacent the second side of the support surface. Also, a drive wheel is mounted on the frame substantially on the centerline of the frame behind the first and second wheels.

In accordance with the preferred embodiment of the three wheeled skateboard, the user can apply torque to the hub of the drive wheel through a pedal system in order to propel the skateboard. Specifically, two pedals are pivotally mounted side-by-side on the skateboard, and are coupled to the hub of the drive wheel to impart torque to the drive wheel only when the pedals are urged in a predetermined direction. More specifically, each pedal has front and back ends and is pivotally movable independently of the other pedal between a thrust position, wherein the front end of the pedal is raised from the frame, and a rest position, wherein the front end of the pedal is substantially flush with the frame. The back ends of the pedals are connected to the hub of the drive wheel in a ratchet arrangement.

Springs are mounted on the frame to urge the pedals toward the thrust position. When the user steps on one of the pedals to depress the pedal toward the rest position, the pedal engages the hub of the drive wheel to impart torque to the drive wheel. On the other hand, when the user releases the pedal, the spring that is associated with the pedal urges the pedal toward the thrust position. Because of the ratchet engagement of each pedal with the hub of the drive wheel, no torque is imparted to the drive wheel when a pedal is moved toward the thrust position. Accordingly, the user can propel the skateboard by alternately depressing and releasing the pedals.

If desired, the back end of each pedal can be coupled to a sprocket, and the sprocket connected via a chain and gear to the hub of the drive wheel, to provide a mechanical advantage in propelling the skateboard. Each gear is engaged in a ratchet arrangement with the hub of the third wheel. Also, a brake pad can be pivotally attached to the frame for movement between a braking position, wherein the pad contacts the drive wheel to retard rotation of the drive wheel, and a neutral position, wherein the pad is distanced from the drive wheel. The brake is positioned on the frame so that the user can urge the brake toward the braking position by stepping on the brake, and a spring is mounted on the frame to urge the brake toward the neutral position.

The details of the structure of the present invention, as well as the operation of the present invention, can be best described in reference to the accompanying drawings, in which like numerals refer to like parts, and in which the drawings are as described below.

DESCRIPTION OF THE PREFERRED EMBODIMENT

Figure 1:
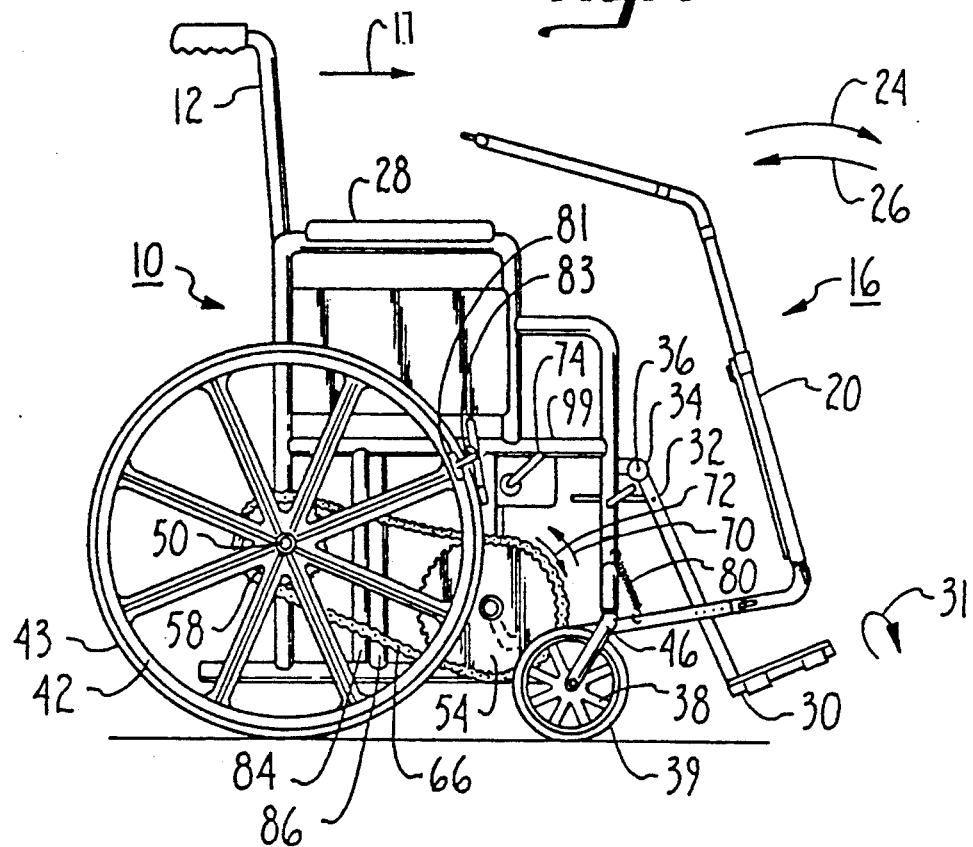
FIG. 1 is a side elevational view of a presently preferred configuration of the wheelchair embodiment of the user-propelled vehicle of the present invention.
Figure 2:
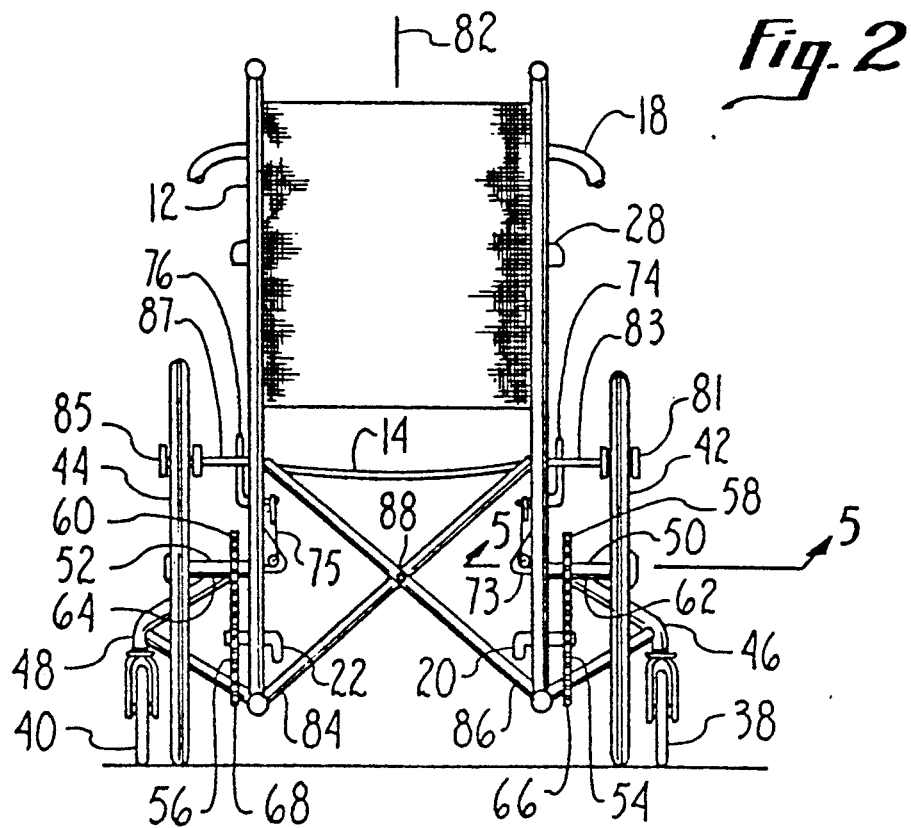
FIG. 2 is a rear view of the wheelchair embodiment of the user-propelled vehicle of the present invention, with most of the propulsor removed for clarity.

Referring initially to FIGS. 1 and 2, a user-propelled vehicle is shown. Direction-based terms, e.g., forward, rearward, inboard, outboard, as used herein are referenced to the direction which would be forward to the user of the wheelchair 10 when the user is seated in the wheelchair 10 facing the direction indicated by the arrow 11. In the specific embodiment shown in FIGS. 1 and 2, the vehicle of the present invention is a wheelchair 10. As shown, the wheelchair 10 includes a frame 12 that has a seat 14 for supporting the user of the wheelchair 10. Preferably, the frame 12 is made of a suitable strong, light-weight material, e.g., stainless steel.

Also, the wheelchair 10 has a propulsor, generally designated 16, which includes a horizontal push-bar 18 and two lever arms 20, 22 extending first downwardly and then rearwardly from respective ends of the push-bar 18. The lever arms 20, 22 are pivotally attached to the frame 12. As more fully disclosed below, the propulsor 16 may be moved as indicated in the directions of the arrows 24, 26 in a pumping motion between a first position, wherein the push-bar 18 is relatively close to the user of the wheelchair 10, and a second position, wherein the push-bar 18 is relatively distanced from the user of the wheelchair 10, to propel and steer the wheelchair 10.

FIG. 1 shows that the frame 12 includes two user arm rests (only arm rest 28 shown in FIG. 1). The arm rest 28 is preferably removably attached to the frame 12 by means well-known in the art, e.g., by bolting the arm rest 28 to the frame 12. Also, the frame 12 includes two user foot rests (only foot rest 30 shown in FIG. 1), and the foot rest 30 is hingedly attached to a foot rest tube 32 for motion of the foot rest 30 in the outboard direction, i.e., the direction indicated by the arrow 31. The foot rest tube 32 is in turn connected to the frame 12 by a nut 34 and bolt 36. Accordingly, the orientation of the foot rest tube 32 relative to the frame 12 (and, hence, the elevation of the foot rest 30) can be adjusted by loosening the nut 34, rotating the foot rest tube 32 about the bolt 36 to the desired orientation, and then tightening the nut 34 onto the bolt 36. It will also be understood that the foot rest 30 can be removed from the wheelchair 10. If desired, the nut 34 can be a wing nut for manipulating the nut 34 by hand.

FIGS. 1 and 2 show that the wheelchair 10 includes two front wheels 38, 40 and two rear drive wheels 42, 44. Preferably, each of the wheels 38, 40, 42, 44 are made of a material which is suitable for wheelchair use, e.g., stainless steel. More preferably, each wheel 38, 40, 42, 44 has a layer of rubber bonded or otherwise attached to the outer periphery of the wheel (rubber layers 39, 43 shown in FIG. 1). As shown best in FIG. 2, each front wheel 38, 40 is rotatably attached to a respective front wheel support tube 46, 48, and each tube 46, 48 is connected to the frame 12. As shown, each tube 46, 48 is bent outboard from the frame 12 to the associated front wheel 38, 40. Consequently, each front wheel 38, 40 is positioned outboard of the frame 12.

It can be appreciated in reference to FIGS. 1 and 2 that each rear wheel 42, 44 is rotationally engaged with the frame 12. More particularly, each rear wheel 42, 44 is fixedly attached to a respective axle 50, 52. In turn, each of the axles 50, 52 is rotationally mounted on the frame 12 by means well-known in the art.

Additionally, FIGS. 1 and 2 show that each of the lever arms 20, 22 is fixedly attached to a respective large sprocket 54, 56. Each large sprocket 54, 56 is rotatably attached to the frame 12. Thus, each lever arm 20, 22 is pivotally attached to the frame 12 through its respective large sprocket 54, 56. Also, each rear wheel 42, 44 is associated with a respective gear assembly 58, 60. Each gear assembly 58, 60 includes one, and, in embodiments of the wheelchair of the present invention that has no reverse gear, preferably a plurality of toothed sprocket gears. Further, the gear assemblies 58, 60 are selectively ratchetably engageable with the respective axles 50, 52 through respective ratchet-clutch assemblies 62, 64.

A bicycle-type chain 66 is engaged with the teeth of the large sprocket 54 and with the teeth of one of the gears of the gear assembly 58 for imparting torque from the large sprocket 54 to the gear assembly 58. Similarly, a bicycle-type chain 68 is engaged with the teeth of the large sprocket 56 and with the teeth of one of the gears of the gear assembly 60 for imparting torque from the large sprocket 56 to the gear assembly 60. If desired, bicycle-type chain guards (not shown) can be mounted on the frame 12 to shield the user of the wheelchair 10 from the chains 66, 68.

Accordingly, it can now be understood that motion of the propulsor 16 in the directions indicated by the arrows 24, 26 respectively causes the large sprockets 54, 56 to rotate in the directions indicated by the arrows 70, 72. It can be further understood that the torque so imparted to the large sprockets 54, 56 is transferred through the chains 66, 68 to the gear assemblies 58, 60. In turn, the gear assemblies 58, 60 can be selectively engaged with the axles 50, 52 through the ratchet-clutch mechanisms 62, 64, as more fully disclosed below, to impart torque to the axles 50, 52 (and, hence, the rear wheels 42, 44).

The embodiment of the wheelchair 10 shown in FIGS. 1 and 2 includes a reverse gear, as more fully disclosed below. When the wheelchair of the present invention includes a reverse gear, the chains 66, 68 extend between the respective large sprockets 54, 56 and gear assemblies 58, 60. Moreover, the present invention contemplates a wheelchair (not shown) wherein no reverse gear is provided, and wherein each of the gear assemblies includes a plurality of toothed gears. In such an embodiment, the chains which extend between the gear assemblies and the large sprockets will also extend around suitable bicycle-type derailleurs, for selectively shifting the chains onto the particular toothed gear that is appropriate for providing the degree of mechanical advantage desired by the user of the wheelchair. Such a multi-gear wheelchair could also include a reverse gear, provided that the derailleurs are configured to transfer torque in the reverse direction.

In cross-reference to FIGS. 1 and 2, two shift levers 74, 76 are shown mounted on the frame 12. As shown in FIGS. 1 and 2, the levers 74, 76 can be mounted adjacent the seat 14. Alternatively, the levers 74, 76 can be conveniently located on the push-bar 18. Each shift lever 74, 76 is pivotally attached to the frame 12, and each has a forward, neutral, and reverse position for operation to be subsequently disclosed. The shift levers 74, 76 are attached to respective cables 73, 75 which are mounted by means well-known in the art on the frame 12, for purposes to be disclosed below. Specifically, the cables 73, 75 extend between the levers 74, 76 and the wheels 42, 44, and conform to the respective portions of the frame 12 which are therebetween. The levers 74, 76 are fastened to the frame 12 by well-known means, e.g., cable stays (not shown).

Still referring to FIG. 1, a spring 80 is shown attached to the frame 12 and to the lever arm 20. It is to be understood that another spring (not shown) is attached to the frame 12 and the lever arm 22. The spring 80 is in tension, so that the spring 80 constantly urges the propulsor 16 toward the thrust position, i.e. toward the direction indicated by the arrow 26. A rubber stop (not shown) can be mounted on the frame 12 to limit motion of the propulsor 16 in the direction indicated by the arrow 26.

As best shown in FIG. 1, a caliper brake 81 is attached to a bracket 83, and the bracket 83 is mounted on the frame 12. Also, as shown in FIG. 2, a caliper brake 85 is attached to a bracket 87, and the bracket 87 is mounted on the frame 12. The brakes 81, 85 can be of the type used on bicycles, and can accordingly be operated by respective cables (not shown in FIG. 2) similar to the cables 73, 75 to urge the pads of the brakes 81, 85 against the wheels 42, 44 to retard rotation of the wheels 42, 44.

As intended by the present invention and shown in reference to FIG. 2, the wheelchair 10 is symmetrically collapsible about its longitudinal axis 82. Specifically, portions of the support structure of the frame 12 may be moved so that the wheelchair 10 folds about its axis 82. More specifically, as shown best in FIG. 2, the frame 12 includes transverse support members 84, 86, each of which is rotatably attached to the frame 12 near the lower end of the member 84, 86 and slidably connected to the frame 12 near the upper end of the member 84, 86 in accordance with principles well-known in the wheelchair art. Specifically, the members 84, 86 can be formed with respective rings near their upper ends, and the rings slidably engaged with a seat support portion 99 of the frame 12. Also, the members 84, 86 are coupled together intermediate their ends by means of a pivot pin 88. The upper ends of the members 84, 86 lock in their operational positions shown in FIG. 2 by means well-known in the art, and can selectively be disengaged from the frame 12 to slide relative to the frame 12 to thereby collapse the wheelchair 10 about the axis 82. Additionally, the propulsor 16 includes provisions for folding the propulsor 16 about the axis 82, as best seen in FIG. 3.

Figure 3:
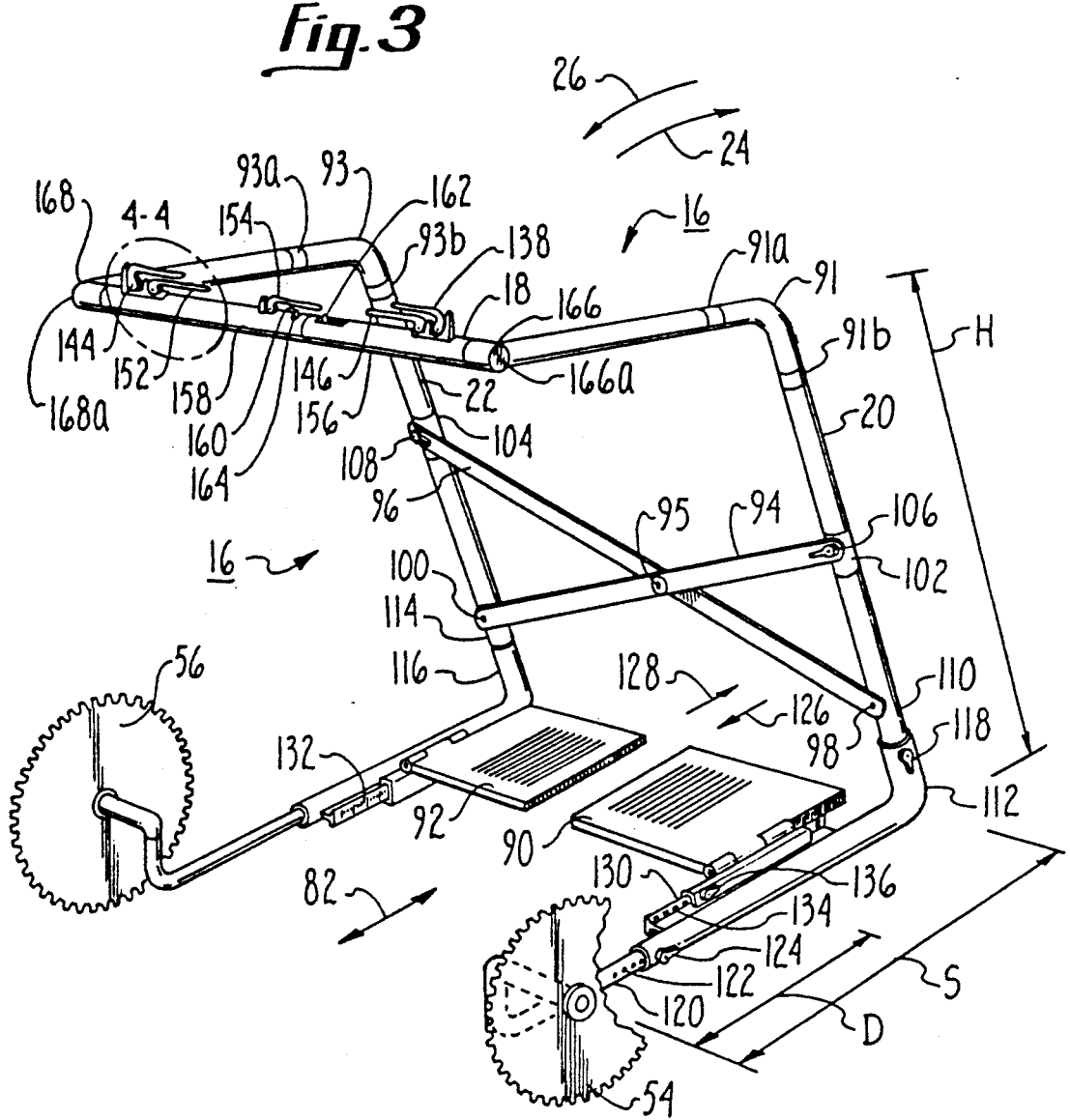
FIG. 3 is a perspective view of the propulsor of the wheelchair embodiment of the present invention.

Referring now to FIG. 3, the details of the propulsor 16 can be seen. More particularly, FIG. 3 shows that two pedals 90, 92 are fixedly mounted on the lever arms 20, 22 of the propulsor 16 such that the user of the wheelchair 10 can place his feet on the pedals 90, 92 and urge against the lever arms 20, 22 to move the propulsor 16 in the direction indicated by the arrow 24. Accordingly, the user of the wheelchair can move the propulsor 16 by urging forwardly against the push-bar 18, or by depressing the pedals 90, 92, or both.

Also, FIG. 3 shows that each lever arm 20, 22 is connected to the push-bar 18 via a respective elbow 91, 93. It is to be appreciated in reference to FIG. 3 that the elbows 91, 93 are rotatably connected to the push-bar 18 at the joints 91a, 93a. Also, the elbows 91, 93 are rotatably connected to the respective lever arm 20, 22 at the joints 91b, 93b. These rotatable joint connections can be made by any well-known means, e.g., by forming the elbows 91, 93 as hollow sleeves and then sliding the elbows 91, 93 onto the push bar 18 and lever arms 20, 22.

FIG. 3 further shows that the propulsor 16 includes transverse support braces 94, 96. Each brace 94, 96 is pivotally attached to a respective lever arm 20, 22 by respective pivot rivets 98, 100. Also, the braces 94, 96 are respectively attached to slide rings 102, 104, and the slide rings 102, 104 are slidably engaged with the lever arms 20, 22. Specifically, tightening screws 106, 108 extend through the slide rings 102, 104 and can be tightened onto the respective lever arms 20, 22 to hold the slide ring 102, 104 stationary with respect to the lever arm 20, 22. Further, the tightening screws 106, 108 can be rotated to permit slidable motion of the rings 102, 104 upwardly and downwardly along the lever arms 20, 22.

Additionally, the braces 94, 96 are connected together by a pivot pin 95, and each brace 94, 96 can rotate about the pin 95. Accordingly, when it is desired to collapse the wheelchair about its longitudinal axis 82, the tightening screws 106, 108 are loosened, and the slide rings 102, 104 moved upwardly on the lever arms 20, 22 to move the lever arms 20, 22 toward the axis 82.

Still referring to FIG. 3, the dimension of the propulsor 16 can be adjusted as appropriate for the user of the wheelchair 10. Specifically, the lever arm 20 includes a post 110 and a sleeve 112, and the lever arm 22 includes a post 114 and a sleeve 116. The sleeve 112 can slide relative to the post 110, and the sleeve 116 can slide relative to the post 114.

A tightening screw 118 extends through the sleeve 112 and can be tightened to engage one of a plurality of holes (not shown) which are formed on the post 110 to hold the sleeve 112 stationary with respect to the post 110. Also, a tightening screw (not shown) extends through the sleeve 116 and can be tightened against the post 114 to hold the sleeve 116 stationary with respect to the post 114. Thus, the tightening screw 118 can be loosened and the height H of the push bar 18 relative to the sleeves 112, 116 established as desired. Then, the tightening screw 118 can be tightened to hold the sleeves 112, 116 stationary with respect to the posts 110, 114.

Additionally, FIG. 3 shows that the distance S of the sleeve 112 from the large sprocket 54 can be established as desired. More particularly, the sleeve 112 is slidably engaged with a post 120, and a plurality of holes 122 are formed in the post 120. A tightening screw 124 extends through the sleeve 112 and can be engaged with one of the holes 122 to establish a predetermined distance S as appropriate for the user of the wheelchair 10.

FIG. 3 also shows that the pedals 90, 92 can be moved in the directions indicated by the arrows 126, 128 as appropriate for the particular user of the wheelchair 10. More specifically, each pedal 90, 92 is slidably engaged with a respective rail 130, 132, and the rails 130, 132 are respectively attached to the inboard surfaces of the lever arms 20, 22. The rails 130, 132 have a plurality of grooves 134 formed thereon. A portion (not shown) of a tightening screw 136 extends inwardly through a portion of the pedal 90 and can be tightened to engage one of the grooves 134 to establish a desired value for the distance D from the screw 136 to the large sprocket 54. Likewise, the position of the pedal 92 can be adjusted forwardly and rearwardly as desired for the particular user of the wheelchair 10.

Figure 4:
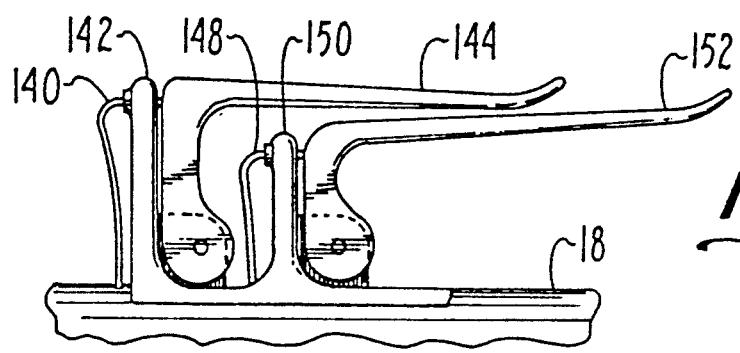
FIG. 4 is a detailed view of the structure indicated by the curve 4—4 in FIG. 3, showing one of the cable operating mechanisms on the propulsor of the present invention.

In cross-reference to FIGS. 3 and 4, means for causing the brakes 81, 85 to retard rotational motion of the wheels 42, 44 are shown. Moreover, means for operating the ratchet-clutch mechanisms in accordance with the disclosure below are shown. More particularly, as shown in FIG. 3, two brake levers 138, 144 are pivotally connected to the push-bar 18, and two clutch levers 146, 152 are pivotally mounted on the push-bar 18.

FIG. 4 shows the details of the configuration of the brake lever 144 and clutch lever 152, which are in all essential respects identical in operation and configuration to the brake lever 138 and clutch lever 146 shown in FIG. 3. As shown in FIG. 4, the brake lever 144 is connected to a cable 140, and the cable 140 is routed through the lever arm 22 and the frame 12 by means well-known in the art and is connected to the operating mechanism of the brake 85, shown in FIG. 2. Also, the cable 140 is slidably engaged with a support stud 142, for anchoring the cable 140 on the push-bar 18. When the brake lever 144 is depressed, the cable 140 is pulled, causing the pads of the brake 85 to contact the wheel 44 and retard motion of the wheel 44. Similarly, the brake lever 138 can be used to operate the brake 81, shown in FIG. 2.

As further shown in FIG. 4, the clutch lever 152 is mounted next to the brake lever 144 and is attached to a cable 148. In accordance with the present invention, the cable 148 is slidably engaged with a support stud 150 and is routed through the lever arm 22 and the frame 12 by means well-known in the art. The cable 148 is connected to the ratchet-clutch mechanism 64. Accordingly, the clutch lever 152 has an undepressed position, shown in FIG. 4, wherein the ratchet-clutch mechanism 64 can be placed in the forward position, and a depressed position, wherein the clutch lever 152 pulls the cable 148 to shift the ratchet-clutch mechanism 64 into neutral, as more fully described below. Similarly, the clutch lever 146 is attached to a cable 147 (shown in FIG. 5A and discussed below) for operating the ratchet-clutch mechanism 62.

Also, a clutch lever 146 is pivotally mounted on the push-bar 18 and attached to a cable 147, shown in FIGS. 5A–5C The cable 147 is anchored on a support stud (not shown in FIG. 3) and is routed through the lever arm 20 and the frame 12 by means well-known in the art to the ratchet-clutch mechanism 62 for operation to be subsequently disclosed. The clutch lever 146 has an undepressed position, shown in FIG. 3, wherein the ratchet-clutch mechanism 62 can be placed in the forward position, and a depressed position, wherein the clutch lever 146 pulls the cable 147 to shift the ratchet-clutch mechanism 62 into neutral, as more fully described below.

It can be appreciated in reference to FIG. 3 that the clutch levers 146, 152 can be operated independently of the brake levers 138, 144 and each other. On the other hand, when the brake lever 144 is depressed, the clutch lever 152 is also depressed by the brake lever 144. Likewise, when the brake lever 138 is depressed, the clutch lever 146 is also depressed by the brake lever 138. It is to be understood that while the brake lever-clutch lever arrangement described above is discussed in the context of a wheelchair embodiment of the user-propelled vehicle of the present invention, it may also be used to independently control the speed of the wheels of other embodiments, e.g., scooters and tricycles. Further, the brake lever-clutch lever arrangement as herein shown and described can be used to control the speed of the wheels of motorized vehicles, such as snowmobiles, electric-powered wheelchairs, and motorcycles.

FIG. 3 further shows that a means is provided for simultaneously operating both brakes 81, 85 and both ratchet-clutch mechanisms 62, 64. More specifically, a central operating lever 154 is pivotally mounted on the push-bar 18. Four cables (not shown) are attached to the lever 18 and are respectively routed through the lever arm 22 and frame 12 to the brakes 81, 85 and ratchet-clutch mechanisms 62, 64. When the central operating lever 154 is depressed, the cables which are connected to the ratchet-clutch mechanisms 62, 64 are pulled, which operates the ratchet-clutch mechanisms 62, 64 to shift the gear assemblies 58, 60 into their respective neutral gears. Also, when the central operating lever 154 is depressed, the cables which are connected to the brakes 81, 85 are pulled, causing the pads of the brakes 81, 85 to urge against the wheels 42, 44.

FIG. 3 also shows that the push-bar 18 includes a first segment 156 and a second segment 158, and the segments 156, 158 can be disconnected from each other incident to folding the wheelchair 10. More particularly, the first segment 156 includes a spring-biased detent 160 and a detent pushbutton 162 which is connected to the detent 160. Also, the second segment 158 includes a hole 164, and the detent 160 is biased upwardly to an engaged position wherein the detent 160 is received in the hole 164 to fixedly connect the first segment 156 to the second segment 158.

In accordance with the present invention, however, the first segment 156 can be detached from the second segment 158 by depressing the detent pushbutton 162 to disengage the detent 160 from the hole 164 and pulling the segments 156, 158 apart. It is to be understood that the lever arms 20, 22 have sufficient inherent elasticity to permit pulling the segment 156 a short distance away from the segment 158. Also, the segments 156, 158 are hingedly connected to the lever arms 20, 22 at hinges 91a, 93a. Thus, after the segments 156, 158 have been disconnected from each other, the segments 156, 158 can be folded and the propulsor 16 collapsed about the axis 82 incident to folding the wheelchair 10.

Further, the bar 18, may be rotatably connected to the lever arms 20, 22 at the joints 166, 168, so that the user of the wheelchair 10 can rotate the bar 18 to orient the clutch levers 146, 152 and brake levers 138, 144 and central operating lever 154 as desired relative to the user. Tightening screws 166a, 168a can extend into the push-bar 18 to hold the push bar stationary relative to the lever arms 20, 22. Alternatively, central operating lever 154 and each of the clutch levers 146, 152 and brake levers 138, 144 can be individually movably mounted on the push-bar 18 to permit custom positioning of the particular lever on the bar 18.

Now referring to FIGS. 5A–5C and FIGS. 6A–6C, the details of the ratchet-clutch mechanism 62 can be seen. The purpose of the ratchet-clutch mechanism 62 is to selectively transfer torque from the gear assembly 58 to the rear wheel 42 to selectively turn the wheel 42 in the forward or reverse direction when the propulsor 16 is pumped by the user of the wheelchair 10.

It is to be understood that the other ratchet-clutch mechanism 64 is in all essential respects made the same as the mechanism 62. It is to be further understood that while the Figures show one embodiment of a ratchet-clutch mechanism 62, other suitable mechanisms can be used. For example, if no reverse gear is to be incorporated in the ratchet-clutch mechanism of the present invention, a bicycle-type rear wheel gear cluster and derailleur can be used in place of the mechanism 62 shown and disclosed herein, if a means for selectively disengaging the gear cluster on the forward stroke is included.

Figure 5A:
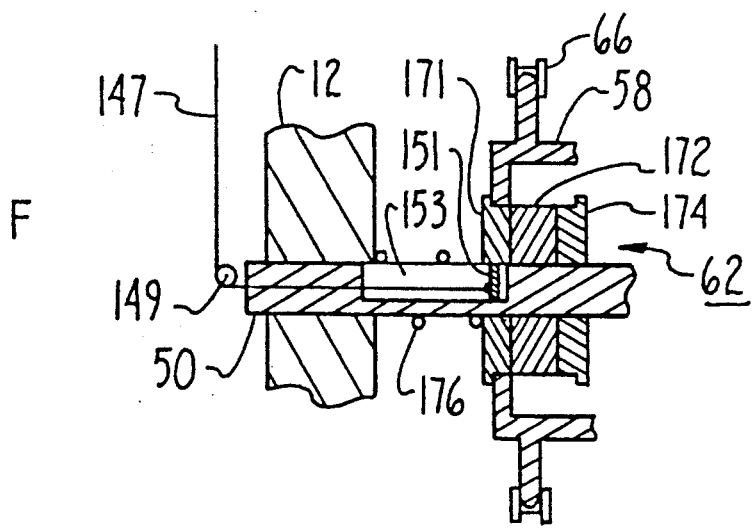
FIG. 5A is a cross-sectional view of one ratchet-clutch mechanism of the wheelchair embodiment of the present invention, engaged for propelling the wheelchair in the forward direction, as seen along the line 5—5 in FIG. 2.

FIG. 5A shows that the ratchet-clutch mechanism 62 includes a cylindrical forward gear 170, a cylindrical neutral gear 172, and a cylindrical reverse gear 174. As shown in FIG. 5A, the neutral gear 172 is wider than the forward and reverse gears 170, 174. As will be more fully disclosed below, the neutral gear 172 is relatively wide to ensure that when the clutch lever 146 is fully depressed, the ratchet-clutch mechanism 62 will shift from forward to neutral without shifting past neutral into reverse.

FIG. 5A shows that a disc 151 is fixedly attached, e.g., by welding, to the forward gear 170. As shown in reference to FIG. 5A, the disc 151 is slidably disposed in a channel 153 that is formed in the axle 50. Recall that the cable 147 is connected to the clutch lever 146 on the push-bar 18. This cable 147 is also connected to the disc 151 for moving the ratchet-clutch mechanism 62 into the various positions relative to the gear assembly 58 shown in FIGS. 5A–5C in response to movement of the clutch lever 146. As shown in FIG. 5A, the cable 147 extends around a cable stay 149 and through the axle 50. Also, a spring 176 is positioned in compression between the frame 12 and the ratchet-clutch mechanism 62 for urging the mechanism 62 toward the position shown in FIG. 5A.

Accordingly, it will be appreciated that the spring 176 urges the ratchet-clutch mechanism 62 toward the position shown in FIG. 5A, wherein the forward gear 170 is engaged with the gear assembly 58. Further, the ratchet-clutch mechanism 62 can be moved into the neutral position shown in FIG. 5B and the reverse position shown in FIG. 5C, as will be more fully disclosed below in reference to the operation of the wheelchair 10.

Figure 6A:
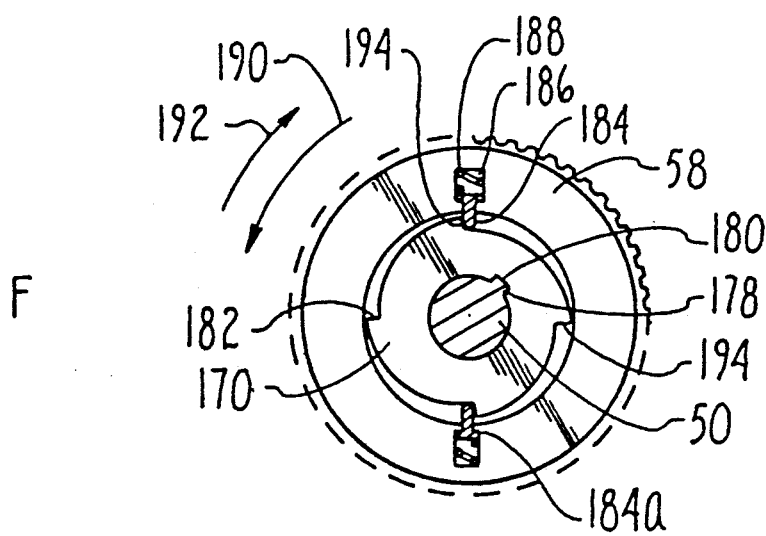
FIG. 6A is a side view of the ratchet-clutch mechanism shown in FIG. 5A.
Figure 6B:
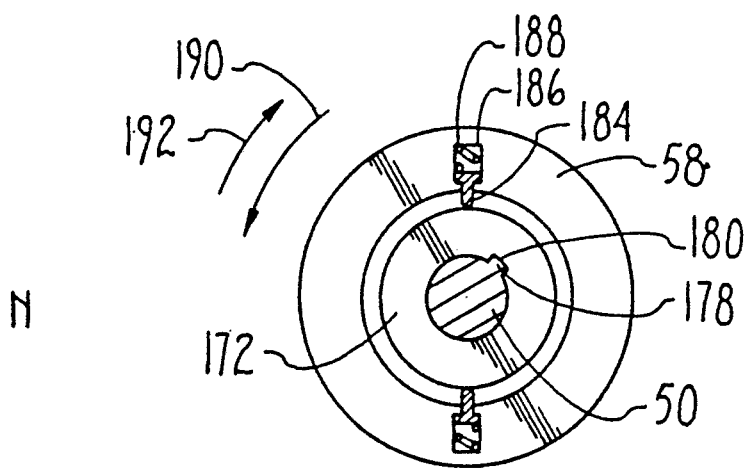
FIG. 6B is a side view of the ratchet-clutch mechanism shown in FIG. 5B.
Figure 6C:
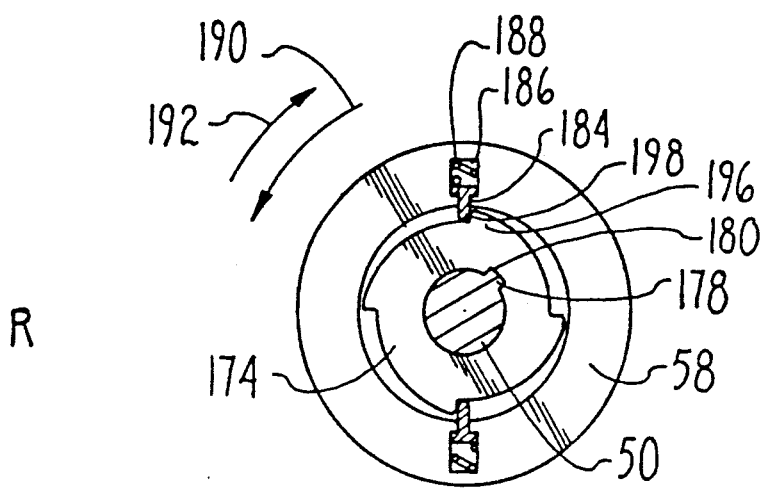
FIG. 6C is a side view of the ratchet-clutch mechanism shown in FIG. 5C.

As shown in FIGS. 6A–6C, the ratchet-clutch mechanism 62 is rotationally engaged with the axle 50. More specifically, the axle 50 has a key 178 which extends along the axle 50 parallel to the axis of the axle 50 and which is engaged with a groove 180 that is formed in the mechanism 62. Thus, the axle 50 rotates with the ratchet-clutch mechanism 62. In other words, the ratchet-clutch mechanism is rotationally coupled to the axle 50, and can slide transversely relative to the axle 50.

When the cable 147 is not pulled, the mechanism 62 is urged into the position shown in FIGS. 5A and 6A, i.e., with the forward gear 170 rotationally engaged with the gear assembly 58, by the spring 176 (shown in FIG. 5A). Specifically, the forward gear 170 includes a plurality of teeth 182 which can contact a plunger 184 of the gear assembly 58. As shown, the plunger 184 is slidably disposed in a channel 186 that is formed in the gear assembly 58. A plunger spring 188 is also disposed in compression in the channel 186 to urge the plunger 184 toward the forward gear 170. FIG. 6A shows that if desired, a second plunger 184a can be provided with associated channel 186a and spring 188a. The second plunger 184a and associated channel 186a, spring 188a are in all essential respects identical to the plunger 184, channel 186, and spring 188.

It can be appreciated in reference to FIG. 6A that the teeth 182 are shaped for ratcheting engagement with the plungers 184, 184a. More particularly, taking the plunger 184 as an example, when the gear assembly is rotated in the direction indicated by the arrow 190, i.e., by moving the propulsor 16 in the direction indicated by the arrow 24 in FIG. 1, the plunger 184 slides along the periphery of the forward gear 170 until the plunger 184 contacts a face 194 of one of the teeth 182. Because of the profile of the teeth 182, the plunger 184 remains in contact with the face 194. Accordingly, the plunger 184 transfers torque from the gear assembly 58 to the forward gear 170 (and, hence, to the axle 50) when the gear assembly 58 is rotated in the direction indicated by the arrow 190.

On the other hand, when the gear assembly 58 is rotated in the direction indicated by the arrow 192, i.e., by moving the propulsor 16 in the direction indicated by the arrow 26 in FIG. 1, the plunger 184 slides along the periphery of the forward gear 170 and does not remain in contact with the face 194. Instead, the plunger 184 reciprocates within the channel 186 as necessary to follow the contour of the periphery of the forward gear 170. The plunger spring 188 urges against the plunger 184 to keep the plunger 184 in contact with the periphery of the forward gear 170.

As intended by the present invention, when the clutch lever 146 is in the undepressed position shown in FIG. 3, the ratchet-clutch mechanism 62 is in the forward position shown in FIGS. 5A and 6A. The throw of the clutch lever 146 from the undepressed position to the fully depressed position pulls the cable 147 an amount sufficient to shift the ratchet-clutch mechanism 62 into the neutral position, shown in FIGS. 5B and 6B. On the other hand, the throw of the clutch lever 146 is insufficient to shift the ratchet-clutch mechanism 62 into the reverse gear, i.e., the position shown in FIGS. 5C and 6C.

Additionally, a cable (not shown) which is in all essential respects identical to the cable 147 connects the central operating lever 154 to the cable 147. Specifically, referring briefly back to FIG. 3, a cable extends from the central operating lever 154 through the push-bar 18 and is attached to the cable 147 near the clutch lever 146. Thus, when the central operating lever 154 is depressed, the ratchet-clutch mechanism is shifted from the forward gear to the neutral gear. The throw of the central operating lever 154, however, is insufficient to shift the ratchet-clutch mechanism 62 into the reverse gear.

Further, recall that the cable 73 shown in FIG. 2 is attached to the shift lever 74. This cable 73 is also connected to the cable 147. Thus, the shift lever 74 operates the cable 73 and, in turn, the cable 147.

Figure 5B:
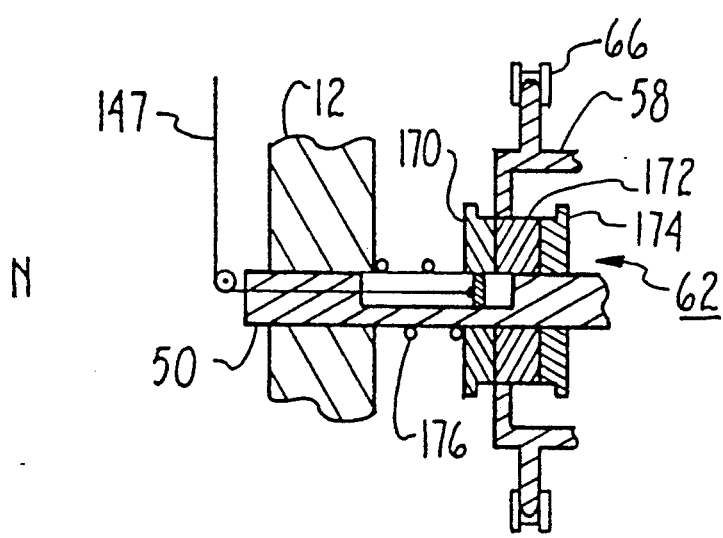
FIG. 5B is a cross-sectional view of one ratchet-clutch mechanism of the wheelchair embodiment of the present invention, with the clutch in the disengaged position, as would be seen along the line 5—5 in FIG. 2.

Accordingly, it can now be appreciated that by depressing one of the levers 146, 154, or moving the shift lever 74 to the neutral position, cable 147 is pulled to move the ratchet-clutch mechanism 62 transversely relative to the axle 50 and gear assembly 58 to the position shown in FIGS. 5B and 6B. As shown in FIG. 6B, the neutral gear 172 has no teeth, and consequently does not engage the gear assembly 58. Accordingly, no torque is transferred from the gear assembly 58 to the axle 50 when the ratchet-clutch mechanism 62 is in the position shown in FIG. 6B.

Figure 5C:
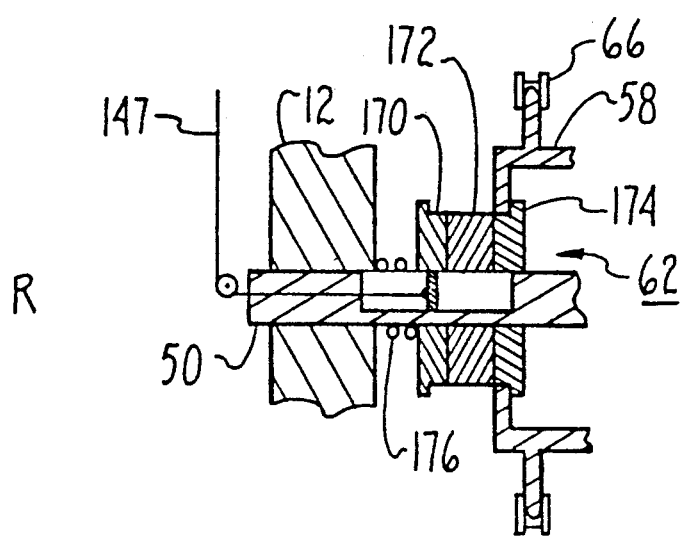
FIG. 5C is a cross-sectional view of one ratchet-clutch mechanism of the wheelchair embodiment of the present invention, engaged for propelling the wheelchair in the reverse direction, as would be seen along the line 5—5 in FIG. 2.

To shift the ratchet-clutch mechanism 62 into reverse, i.e., the position shown in FIGS. 5C and 6C, the shift lever 74 is moved to a reverse position, wherein the cable 73 (and, hence, the cable 147) are pulled to shift the ratchet-clutch mechanism 62 into reverse. In other words, placing the shift lever 74 in reverse pulls the cable 147 an amount sufficient to move the ratchet-clutch mechanism 62 transversely past the position shown in FIGS. 5B and 6B and into the position shown in FIGS. 5C and 6C to engage the reverse gear 174 with the gear assembly 58. Specifically, the reverse gear 174 includes a plurality of teeth 196 which can contact the plunger 184 of the gear assembly 58 and thereby engage the axle 50 with the gear assembly 58.

It can be appreciated in reference to FIG. 6C that the teeth 196 are shaped for ratcheting engagement of the teeth 196 with the plungers 184, 184a. More particularly, taking the plunger 184 as an example, when the gear assembly 58 is rotated in the direction indicated by the arrow 192, i.e., by moving the propulsor 16 in the direction indicated by the arrow 26 in FIG. 1, the plunger 184 slides along the periphery of the reverse gear 174 until the plunger 184 contacts a flat face 198 of one of the teeth 196. Because of the profile of the teeth 196, the plunger 184 remains in contact with the face 198. Accordingly, the plunger 184 transfers torque from the gear assembly 58 to the reverse gear 174 (and, hence, to the axle 50) when the gear assembly 58 is rotated in the direction indicated by the arrow 192.

On the other hand, when the gear assembly 58 is rotated in the direction indicated by the arrow 190, i.e., by moving the propulsor 16 in the direction indicated by the arrow 24 in FIG. 1, the plunger 184 slides along the periphery of the reverse gear 174 and does not remain in contact with the face 198. Instead, the plunger 184 reciprocates within the channel 186 as necessary to follow the contour of the periphery of the reverse gear 174. The plunger spring 188 urges against the plunger 184 to keep the plunger 184 in contact with the periphery of the reverse gear 174.

It is to be appreciated in reference to the disclosure above that when the shift lever 74 is in the forward position, and the levers 146, 154 are not depressed, the ratchet-clutch mechanism 62 is in the forward position shown in FIGS. 5A and 6A. As the skilled artisan will readily appreciate, however, when any one of the levers 74, 146, 154 is moved to its neutral position, (e.g., by depressing one of the levers 146, 154) the cable 147 is pulled to thereby shift the ratchet-clutch mechanism 62 to the neutral position shown in FIGS. 5B and 6B.

The skilled artisan will further appreciate that when the shift lever 74 is moved to the reverse position, the cable 147 is pulled to shift the ratchet-clutch mechanism 62 into the reverse position shown in FIGS. 5C and 6C independently of the positions of the levers 146, 154. As stated above, however, the throw of the levers 146, 154 is insufficient to permit pulling the cable 147 an amount sufficient to move the ratchet-clutch mechanism 62 into the reverse position.

In the operation of the present invention, reference is made to FIGS. 3, 5A-C, and 6A-C. To propel the wheelchair 10 forward, the user of the wheelchair 10 places the gear shift lever 74 in the forward position and pumps the propulsor 16. More specifically, the user of the wheelchair 10 urges downwardly on the push-bar 18, to move the push-bar 18 in the direction indicated by the arrow 24. This causes the large sprockets 54, 56 to rotate in the direction indicated by the arrow 72. If desired, the push-bar 18 can be positioned sufficiently low in the propulsor 16 such that the user of the wheelchair 10 can urge against the push-bar 18 with his feet.

The rotational motion of the large sprockets 54, 56 is transferred through the chains 66, 68 to the gear assemblies 58, 60. When the ratchet-clutch mechanisms 62, 64 are in the forward position, shown in FIGS. 5A and 6A, the rotational motion of the gear assemblies 58, 60 is transferred through the mechanisms 62, 64 to the hubs 50, 52 (and thence to the wheels 42, 44) to propel the wheelchair 10 forward.

As stated above, the spring 80 pulls the propulsor 16 in the direction indicated by the arrow 26. Corresponding motion of the large sprockets 54, 56 in the direction indicated by the arrow 70, however, is not transferred to the wheels 42, 44, because of the ratchetable engagement of ratchet-clutch mechanisms 62, 64 discussed previously. Thus, the spring 80 returns the propulsor 16 to a raised position to facilitate another stroke of the propulsor 16 in the direction indicated by the arrow 24. To stop the wheelchair 10, the user can depress the brake levers 138, 144, to cause the pads of the brakes 81, 85 to contact the wheels 42, 44. Alternatively, the wheelchair 10 can be relatively quickly stopped by depressing the central control lever 154 to simultaneously shift both ratchet-clutch mechanisms 62, 64 to neutral and causing the pads of both brakes 81, 85 to contact their respective wheels 42, 44.

The user of the wheelchair 10 may steer the wheelchair 10 by appropriately depressing the shift levers 146, 152 to shift the associated ratchet-clutch mechanism 62, 64 into the neutral position. When one of the ratchet-clutch mechanisms 62, 64 is in the neutral position, the associated gear assembly 58, 60 is not engaged with the associated axle 50, 52. Consequently, when the user moves the propulsor 16 in the direction indicated by the arrow 24, the torque so generated is not transferred to the wheel 42, 44 with its associated ratchet-clutch mechanism 62, 64 in neutral. Instead, the torque is transferred only to the wheel 42, 44 with its associated ratchet-clutch mechanism 62, 64 in the forward position.

The skilled artisan will accordingly appreciate that the wheelchair 10 will be turned toward the wheel 42, 44 that is in "neutral" when the propulsor 16 is moved in the direction indicated by the arrow 24. Further, the skilled artisan will appreciate that the turning radius of the wheelchair 10 can be decreased by the user of the wheelchair 10 by also depressing the brake lever 138, 144 that is associated with whichever wheel 42, 44 is in neutral. Moreover, the turning radius of the wheelchair 10 can be reduced by moving into the reverse position the shift lever (e.g., the shift lever 74) of the wheel 42, 44 toward which the wheelchair 10 is to be turned.

Additionally, the wheelchair 10 can be propelled by someone other than the user of the wheelchair 10 by moving the shift levers 74, 76 into the neutral position and manually pushing the wheelchair 10, as ordinary wheelchairs are propelled. Also, the wheelchair 10 can be propelled in the reverse direction by moving the shift levers 74 and 76 to the reverse position and then pumping the propulsor 16 in the direction indicated by the arrow 26 in FIG. 1.

Figure 7:
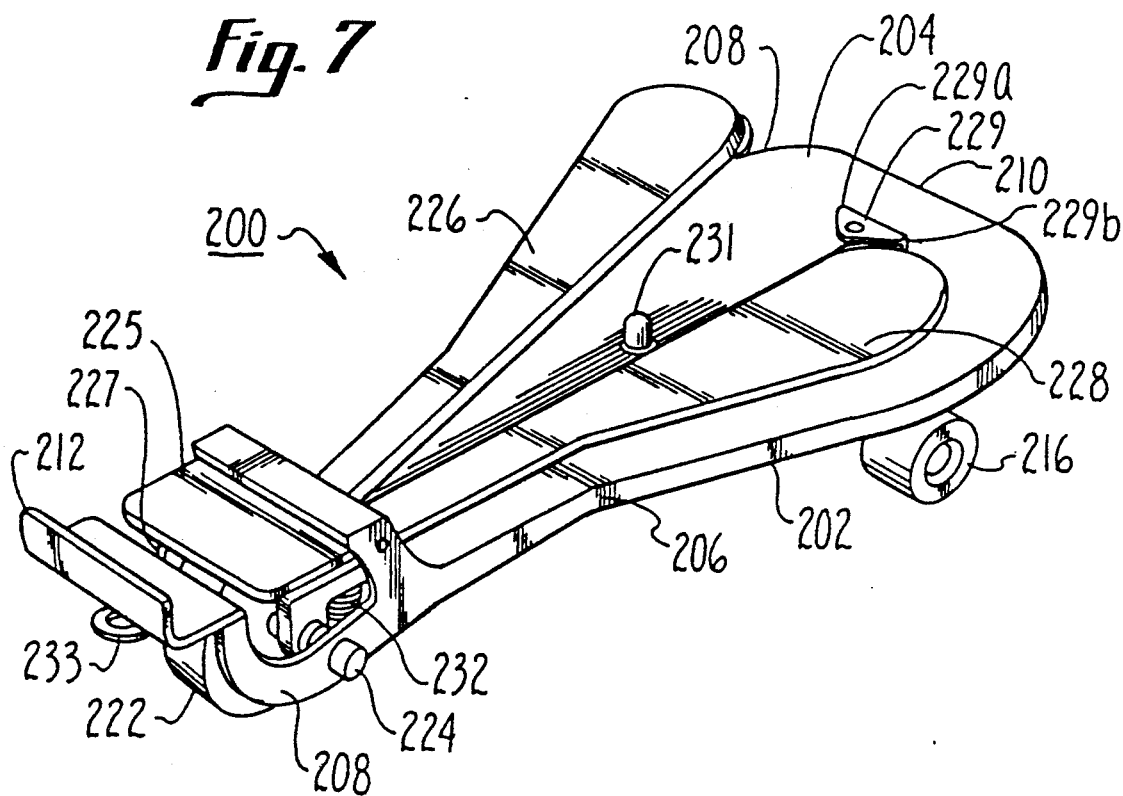
FIG. 7 is a perspective view of one presently preferred configuration of the three-wheeled skateboard embodiment of the present invention.

Now referring to FIG. 7, a skateboard in accordance with the present invention is shown, generally designated 200. As shown, the skateboard 200 includes a frame 202 which has a surface 204 for supporting a user. The surface 204 defines first and second longitudinal sides 206, 208 which extend from the front 210 of the frame 202 to the rear 212 of the frame 202, relative to the direction of intended motion of the skateboard 200.

Figure 8:
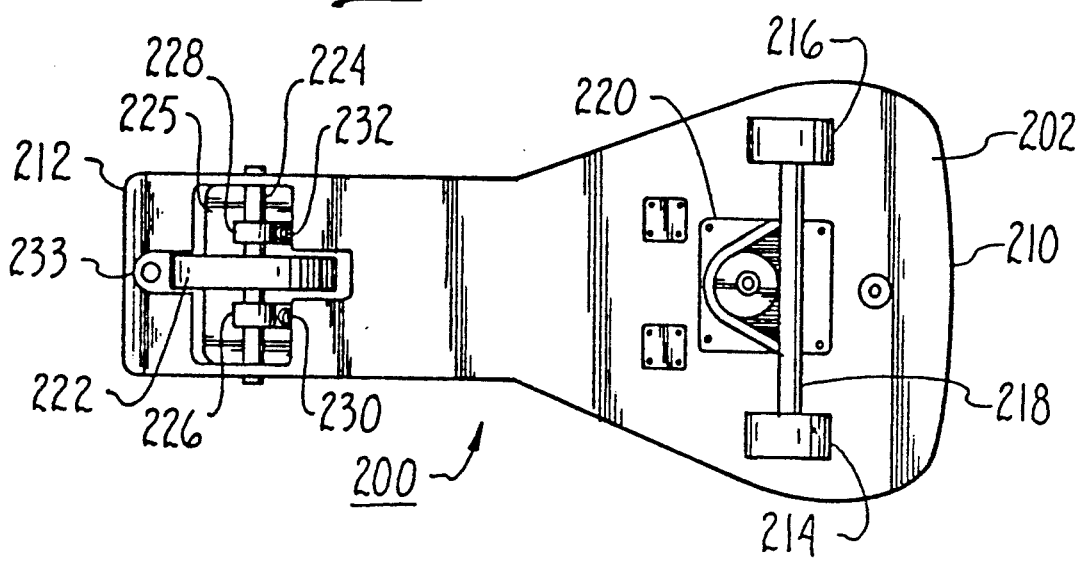
FIG. 8 is a bottom plan view of the three-wheeled skateboard embodiment of the present invention.

In cross-reference to FIGS. 7 and 8, first and second front wheels 214, 216 are shown. It is to be understood that the wheels 214, 216 are rotatably mounted on an axle 218, and the axle 218 is in turn welded to a bracket 220. The bracket 220 can be bolted or otherwise fixedly attached to the frame 202.

Additionally, a drive wheel 222 is mounted on a hub 224, and the hub 224 is rotationally attached to the frame 202. As shown, the drive wheel 222 is mounted on the frame substantially on the centerline of the frame behind the first and second wheels. As further shown in FIG. 7, the rear 212 of the skateboard 200 extends rearwardly and upwardly to establish a balance bar on which the user of the skateboard 200 can place one foot to tilt the skateboard 200 such that only the drive wheel 222 touches the ground, for performing stunts with the skateboard 200.

FIG. 7 shows that a brake plate 225 is pivotally mounted on the frame 202. Specifically, a first end of the brake plate 225 is rotationally mounted on the frame 202, and the second end of the brake plate 225 can be pivoted about the first end. A brake spring 227 is mounted in compression between the brake plate 225 and the frame 202 to urge the brake plate 225 away from the drive wheel 222 when the user is not stepping on the brake plate 225. It is to be appreciated in reference to FIG. 7 that a force can be applied downwardly on the brake plate 225 to cause the brake plate 225 to contact the drive wheel 222 and thereby retard rotational motion of the drive wheel 222.

As also shown in FIG. 7 and disclosed more fully below, first and second pedals 226, 228 are engaged with the hub 224 near the rear (relative to the direction of intended motion of the skateboard 10) of the surface 204. As intended by the present invention, the pedals 226, 228 are coupled to the hub 224 for imparting torque to the hub 224 only when the pedals 226, 228 are moved in one direction.

More specifically, independently of the other pedal, each pedal 226, 228 is pivotally movable between a thrust position, wherein the front end of the pedal 226, 228 is distanced from the frame 202, and a rest position, wherein the front end of the pedal is disposed against the frame 202. Thus, as used herein, the terms "thrust position" and "rest position" refer to operational configurations of the pedals 226, 228. More particularly, when one of the pedals 226, 228 is in the "thrust" position, the pedal 226, 228 is positioned such that the user of the skateboard 200 can urge the pedal 226, 228 downwardly toward the "rest" position to impart torque to the hub 224. In contrast, when in the "rest" position, each pedal 226, 228 is positioned such that the user of the skateboard 10 can stand on one of the pedals 226, 228 and rest thereon, without imparting torque to the hub 224. In FIG. 7, the first pedal 226 is in the thrust position, and the second pedal 228 is in the rest position.

Preferably, a triangular-shaped pedal holder 229 is rotatably mounted on the skateboard 200 for movement between a first position wherein the vertices 229a, 229b hold the pedals 226, 228 flush against the surface 204, and a second position (shown in FIG. 7) wherein the pedal holder 229 does not constrain the pedals 226, 228. Further, two resilient bumpers (only bumper 231 shown in FIG. 7) can be attached to the frame 202 to cushion the pedals 226, 228 when they are urged into the rest position.

FIG. 8 shows that a first pedal spring 230 is mounted in compression between the frame 202 and the first pedal 226, to urge the pedal 226 toward the thrust position. Also, FIGS. 7 and 8 show that a second pedal spring 232 is mounted in compression between the frame 202 and the second pedal 228, to urge the pedal 228 toward the thrust position. Also, a trailer hitch 233 can be welded or bolted to the frame 202 to provide a means for towing a trailer (not shown).

Figure 9:
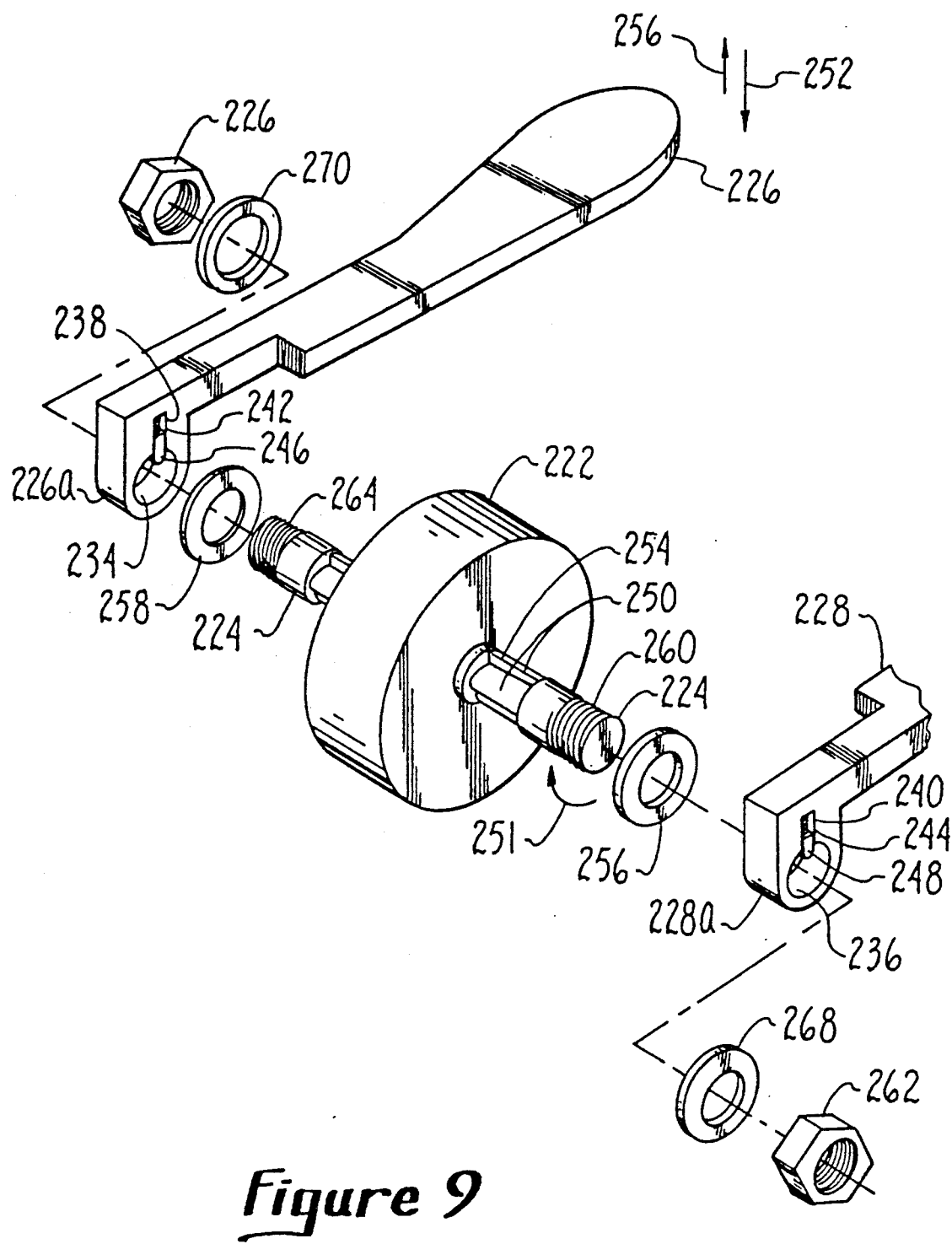
FIG. 9 is an exploded view of the drive wheel, pedals, and ratchet mechanism of the three-wheeled skateboard embodiment of the present invention.

Now referring to FIG. 9, the details of the ratcheting mechanism of the skateboard 200 can be seen. As shown in FIG. 9, the pedals 226, 228 have respective downwardly-oriented extensions 226a, 228a, and the extensions 226a, 228a respectively have first and second openings 234, 236 formed therethrough. It is to be appreciated in reference to FIG. 9 that the openings 234, 236 are coaxial with each other. It is to be further appreciated in reference to FIG. 9 that the hub 224 is closely receivable in the openings 234, 236 for coupling the hub 224 and the pedals 226, 228.

As shown in FIG. 9, the first opening 234 is formed with a first recess 238, and the second opening 236 is formed with a second recess 240. In accordance with the present invention, the recess 238 has a first ratchet spring 242 disposed in compression therein, and the second recess 240 has a second ratchet spring 244 disposed in compression therein. First and second plungers 246, 248 are reciprocally disposed in the respective first and second recesses 238, 240 and are respectively attached to the first and second ratchet springs 242, 244. Accordingly, the ratchet springs 242, 244 urge the plungers 246, 248 toward the axis of the openings 234, 236.

As further shown in FIG. 9, the hub 224 includes a plurality of teeth 250 which extend outboard and parallel to the longitudinal axis of the hub 224. Each of the teeth 250 has a cross-sectional profile that permits ratcheting engagement between the particular tooth 250 and one of the plungers 246, 248. More particularly, the teeth 250 are shaped so that when one or both of the pedals 226, 228 is moved toward the rest position by the user, i.e., in the direction indicated by the arrow 252, the associated plunger 246, 248 abuts a flat face 254 of one of the teeth 250 and remains in contact with the face 254. Consequently, torque is imparted to the hub 224 in the direction indicated by the arrow 251 when the user steps on one or both of the pedals 226, 228 to move the pedal 226, 228 toward the rest position.

On the other hand, substantially no torque is imparted to the hub 224 when one of both of the pedals 226, 228 is moved toward the thrust position in the direction indicated by the arrow 256, e.g., by the force of its associated pedal spring 230, 232. This is because the teeth 250 are contoured so that the plunger 246, 248 that is associated with the particular pedal 226, 228 which is being moved toward the thrust position slides over the surface of the teeth 250.

FIG. 9 further shows that a washer 256 is preferably disposed on the hub 224 between the drive wheel 222 and the pedal 228. Likewise, a washer 258 is preferably disposed on the hub 224 between the drive wheel 222 and the pedal 226. Further, the hub 224 is formed with first threads 260, and a first nut 262 is engageable with the threads 260 to hold the pedal 228 onto the hub 224. Likewise, the hub 224 is formed with second threads 264, and a second nut 266 is engageable with the threads 264 to hold the pedal 226 onto the hub 224. Preferably, a washer 268 is disposed on the hub 224 between the pedal 228 and the nut 262, and a washer 270 is disposed on the hub 224 between the pedal 226 and the nut 266.

In the operation of the three wheeled skateboard 200, the user can propel the skateboard 200 by alternatingly (or simultaneously) moving the pedals 226, 228 toward the rest position. Specifically, when the user steps on one (or both) of the pedals 226, 228 to depress the pedal toward the rest position, the pedal 226, 228 engages the hub 224 to impart torque to the drive wheel 222. On the other hand, when the user releases one (or both) of the pedals 226, 228, the pedal spring 230, 232 that is associated with the released pedal urges the pedal toward the thrust position. Because of the ratchet engagement of each pedal 226, 228 with the hub 224 of the drive wheel 222, no torque is imparted to the drive wheel 222 when one (or both) of the pedals 226, 228 is moved toward the thrust position.

Figure 10:
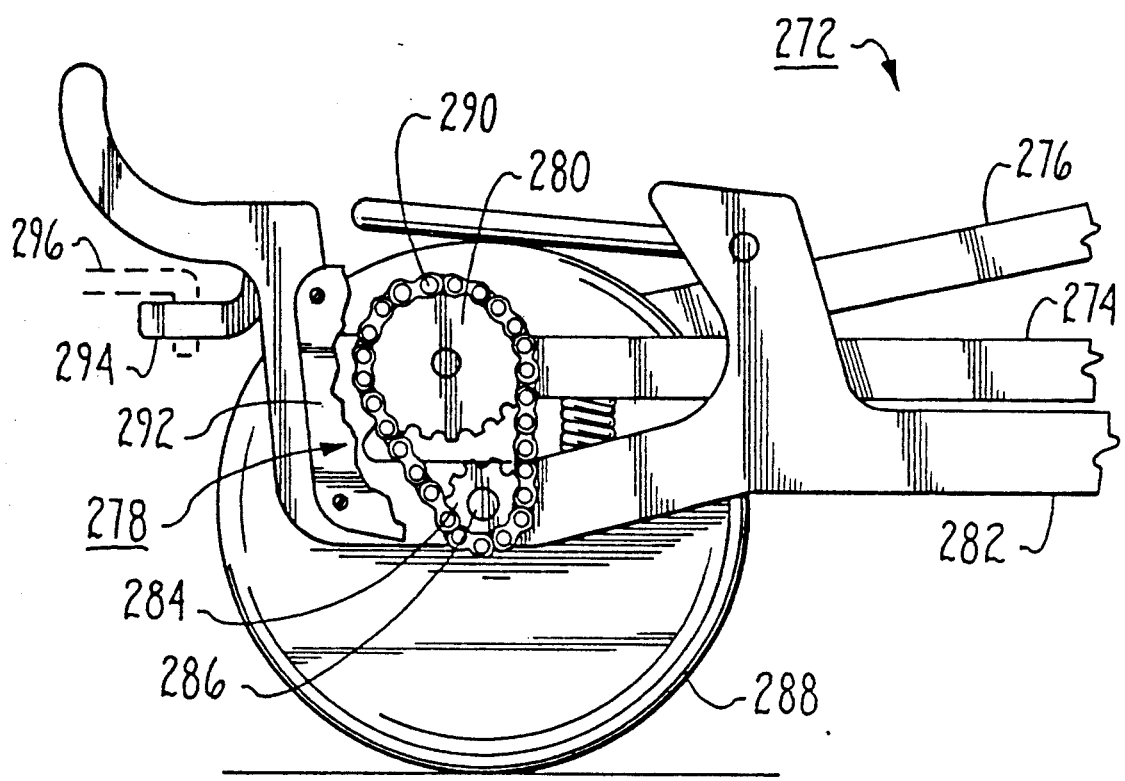
FIG. 10 is a side view of the rear portion of an alternate embodiment of the three-wheeled skateboard embodiment of the present invention with a sprocket-and-chain drive with the chain cover partially broken away for clarity.

Now referring to FIG. 10, the rear portion of an alternate embodiment of the skateboard of the present invention is shown, generally designated 272. It is to be understood that the skateboard 272 is in all essential respects identical to the skateboard 200, with the exception that the skateboard 272 provides a mechanical advantage to the user in propelling the skateboard 272 through a gear-and-sprocket assembly.

More specifically, the skateboard 272 has first and second pedals 274, 276 which are attached to respective first and second gear-and-sprocket assemblies (only assembly 278 shown in FIG. 10). While FIG. 10 shows only the gear-and-sprocket assembly 278 associated with the pedal 274, it is to be understood that the pedal 276 is associated with a gear-and-sprocket assembly which is substantially similar to the assembly 278.

As shown, the assembly 278 includes a sprocket 280 that is rotatably mounted on the frame 282 of the skateboard 272 and is fixedly connected to the pedal 274. Also, a gear 284 is engaged with the hub 286 of a drive wheel 288 to impart torque to the hub 286 only when the gear 284 is turned in one direction. The hub 286 is operatively engaged with the frame 282. A chain 290 connects the sprocket 280 to the gear 284, so that rotational motion of the sprocket 280 is transferred to the gear 284. If desired, a chain guard 292 can be mounted on the skateboard 272 to prevent inadvertent contact between the user and the chain 290. Also, like the skateboard 200, the skateboard 272 can include a trailer hitch 294 for engaging a connector portion 296 (shown in phantom) of a cart or trailer.

As further shown in FIG. 10, the gear 284 has a smaller diameter than the sprocket 280. Accordingly, the skilled artisan will appreciate that the gear-and-sprocket assembly 278 provides a mechanical advantage to the user of the skateboard 272 when the user depresses one (or both) of the pedals 274, 276. The operation of the skateboard 272 is in all other essential respects identical to the operation of the skateboard 200.

While the user-propelled vehicle as herein shown and described in detail is fully capable of achieving the objects hereinbefore stated, it is to be understood that the scope of the present invention is to be limited by nothing other than as recited in the appended claims.

I claim:

1. A user-propelled apparatus, which comprises:
a frame having a surface for supporting a user;
a propulsor including a push bar having first and second ends, said propulsor further including first and second lever arms respectively connected to said first and second ends of said push bar, said lever arms being connected to said frame for movement of said propulsor between a first position and a second position relative to said frame;
first and second sprockets respectively attached to said first and second lever arms;
first and second axles mounted on said frame;
first and second wheels respectively connected to said first and second axles;
first and second gear assemblies rotatably attached to said frame;
first and second chains for respectively coupling said first and second gear assemblies to said first and second sprockets;
first and second ratchet-clutch mechanisms attached to said first and second axles, each said mechanism having an engaged position, wherein said mechanism is coupled to a respective gear assembly for transmitting torque from said gear assembly to the associated axle to cause the associated wheel to turn in a forward direction only when said propulsor is moved toward said first position, each said mechanism also having a neutral position, wherein no torque is transmitted from said gear assembly to said axle; and
first and second control levers, centrally mounted on said push bar, and operably engaged with said first and second ratchet-clutch mechanisms respectively, by which said user can selectively move said first and second ratchet-clutch mechanisms between said engaged and neutral positions by manipulating said first and second control levers respectively while moving said propulsor toward said first position.

2. The user-propelled apparatus recited in claim 1, wherein each lever arm has a variable length.

3. The user-propelled apparatus recited in claim 2, further comprising first and second brakes respectively associated with said first and second wheels for retarding rotation of said wheels.

4. The user-propelled apparatus recited in claim 3, further comprising a propulsion pedal connected to said propulsor and engaged with said lever arms for movement therewith.

5. The user-propelled apparatus recited in claim 4, wherein said frame defines a longitudinal axis, and said frame is foldable about said axis.

6. The user-propelled apparatus recited in claim 5, further comprising a spring attached to said frame and positioned to urge said propulsor toward said second position.

7. The user-propelled apparatus recited in claim 1, wherein each ratchet-clutch mechanism can be selectively moved to a reverse position, wherein the associated gear assembly is coupled to the associated axle such that movement of said propulsor toward said second position causes the associated wheel to turn in a reverse direction.

8. The user-propelled apparatus recited in claim 1, wherein each gear assembly has a plurality of toothed gears for selective engagement of one of said toothed gears with the associated chain.

9. A user-propelled apparatus, which comprises:
a frame having a surface for supporting a user;
a single propulsor including first and second lever arms, and a push bar interconnecting said first and second lever arms, said lever arms being pivotally connected to said frame for movement of said propulsor between a first position and a second position relative to said frame;
first and second control levers centrally mounted on said push bar;
first and second wheels rotatably attached to said frame;
first means for independently coupling said first lever arm to said first wheel for transmitting torque to said first wheel only when said propulsor is moved toward said first position and when said user manipulates said first control lever; and
second means for independently coupling said second lever arm to said second wheel for transmitting torque to said second wheel only when said propulsor is moved toward said first position and when said user manipulates said second control lever,
wherein each said coupling means selectively disengages the associated lever arm from the associated wheel and selectively engages the associated lever arm to the associated wheel.

10. The apparatus as recited in claim 9, wherein each said coupling means includes:
first and second sprockets respectively attached to said first and second lever arms;
first and second gear assemblies rotatably attached to said frame;
first and second chains for respectively coupling said first and second gear assemblies to said first and second sprockets; and
first and second ratchet-clutch mechanisms coupled to said first and second wheels, each said mechanism having an engaged position, wherein said mechanism is coupled to a respective gear assembly for transmitting torque from the gear assembly to the associated wheel to cause the associated wheel to turn in a forward direction only when said propulsor is moved toward said first position, each mechanism also having a neutral position, wherein no torque is transmitted from said gear assembly to said wheel,
wherein said apparatus is propelled when at least one of said clutches is in said engaged position and the user urges said propulsor toward said first position and wherein said apparatus is steerable by selectively engaging said clutches.

11. The user-propelled apparatus recited in claim 10, wherein each lever arm has a variable length.

12. The user-propelled apparatus recited in claim 10, further comprising first and second brakes respectively associated with said first and second wheels for retarding rotation of said wheels.

13. The user-propelled apparatus recited in claim 11, further comprising a propulsion pedal connected to said propulsor and engaged with said lever arms for movement therewith.

14. The user-propelled apparatus recited in claim 12, wherein said frame defines a longitudinal axis, and said frame is foldable about said axis.

15. The user-propelled apparatus recited in claim 13, further comprising a spring attached to said frame and positioned to urge said propulsor toward said second position.

16. The user-propelled apparatus recited in claim 10, wherein each ratchet-clutch mechanism can be selectively moved to a reverse position, wherein the associated gear assembly is coupled to the associated wheel such that movement of said propulsor toward said second position causes the associated wheel to turn in a reverse direction.

17. A user-propelled vehicle which comprises:
   a frame having a surface for supporting a user;
   a propulsor, including a push bar, having a first end connected to a first lever arm and a second end connected to a second lever arm, said lever arms being connected to said frame for movement of said propulsor between a first position and a second position relative to said frame, wherein said movement of said propulsor results at least in part from said user exerting force on said propulsor;
   first and second wheels respectively connected to first and second axles mounted on said frame;
   first and second force transmission mechanisms, having an engaged and a neutral position, operatively engaged with said propulsor and said wheels to thereby selectively transmit force generated by movement of said propulsor to said first and second wheels, causing said first and second wheels to rotate, when said first and second mechanisms are in said engaged position respectively; and
   first and second control levers, mounted on said push bar and operably engaged with said first and second force transmission mechanisms respectively, so that said user can selectively move said first and second force transmission mechanisms between said engaged and neutral positions while moving said propulsor toward said first position.

18. The user-propelled vehicle of claim 17, wherein said user propelled vehicle comprises a wheelchair.

19. The user-propelled vehicle of claim 18, wherein said propulsor is configured to be moved in response to said user pushing against said propulsor with his hands.

20. The user-propelled vehicle of claim 17, further comprising first and second brakes respectively associated with said first and second wheels for retarding rotation of said wheels.

21. The user-propelled vehicle of claim 20, further comprising first and second brake levers, mounted on said push bar so that said user can simultaneously manipulate both said first brake lever and said first control lever, wherein manipulation of said first and second brake levers respectively activates said first and second brakes for retarding rotation of said wheels.

22. The user-propelled vehicle of claim 17, wherein said first and second force transmission mechanisms comprise:
   first and second sprockets respectively attached to said first and second lever arms;
   first and second gear assemblies rotatably attached to said frame; and
   first and second ratchet-clutch mechanisms attached to said first and second axles, each said mechanism having an engaged position, wherein said mechanism is coupled to a respective gear assembly for transmitting torque from said gear assembly to the associated axle to cause the associated wheel to turn in a forward direction only when said propulsor is moved toward said first position, each said mechanism also having a neutral position wherein no torque is transmitted from said gear assembly to said axle.

* * * * *